US012586822B2

(12) United States Patent
Cohen et al.

(10) Patent No.: US 12,586,822 B2
(45) Date of Patent: Mar. 24, 2026

(54) SYSTEM AND METHOD FOR LEAK TESTING A BATTERY CELL

(71) Applicant: Marposs, Chelles (FR)

(72) Inventors: Elie Cohen, Paris (FR); Giuseppe Vollaro, San Lazzaro di Savena (IT)

(73) Assignee: Marposs, Chelles (FR)

( * ) Notice: Subject to any disclaimer, the term of this patent is extended or adjusted under 35 U.S.C. 154(b) by 560 days.

(21) Appl. No.: 18/015,566

(22) PCT Filed: Jul. 13, 2021

(86) PCT No.: PCT/EP2021/069441
§ 371 (c)(1),
(2) Date: Jan. 11, 2023

(87) PCT Pub. No.: WO2022/013211
PCT Pub. Date: Jan. 20, 2022

(65) Prior Publication Data
US 2023/0253633 A1      Aug. 10, 2023

(30) Foreign Application Priority Data

Jul. 15, 2020    (EP) ..................................... 20305812

(51) Int. Cl.
*H01M 10/42*        (2006.01)
*G01M 3/20*        (2006.01)
(52) U.S. Cl.
CPC ....... *H01M 10/4228* (2013.01); *G01M 3/205* (2013.01)

(58) Field of Classification Search
CPC ..... H01M 10/4228; H01M 10/00–667; H01M 6/00–52; G01N 1/00–44; G01N 2001/00–4094; G01M 3/00–40
See application file for complete search history.

(56) References Cited

U.S. PATENT DOCUMENTS

| | | | |
|---|---|---|---|
| 5,317,900 A | 6/1994 | Bergquist | |
| 5,369,983 A * | 12/1994 | Grenfell | G01M 3/229 73/49.3 |
| 6,635,379 B2 * | 10/2003 | Onishi | H01M 10/4285 429/49 |

(Continued)

FOREIGN PATENT DOCUMENTS

| | | |
|---|---|---|
| CN | 101151514 A | 3/2008 |
| CN | 103069261 A | 4/2013 |

(Continued)

*Primary Examiner* — Judy Nguyen
*Assistant Examiner* — James Split
(74) *Attorney, Agent, or Firm* — Blank Rome LLP

(57)        ABSTRACT

Leak testing system (100) and method for leak testing a finished battery cell, comprising a vacuum chamber (4), a vacuum pump (6), a detecting and measuring system (1) to detect gases and/or vapors escaping from the cell, the gases and/or vapors deriving from parts and/or substances inside in the cell, and a capillary element (2) which connects the detecting and measuring system to the vacuum chamber and through which the gases and/or vapors leaking from the cell flow. The system further comprises heating devices adapted to heat at least one of the components of system, thereby making the system substantially memory-free.

20 Claims, 3 Drawing Sheets

(56) References Cited

U.S. PATENT DOCUMENTS

| | | | | |
|---|---|---|---|---|
| 6,670,608 B1 * | 12/2003 | Taylor | ................. | H01J 49/0422 |
| | | | | 250/288 |
| 7,559,231 B2 * | 7/2009 | Kanematsu | ........... | G01M 3/229 |
| | | | | 73/40.7 |
| 9,274,021 B2 * | 3/2016 | Yamamoto | ............ | G01M 3/229 |
| 10,217,621 B2 | 2/2019 | Ruach-Nir et al. | | |
| 11,703,419 B2 | 7/2023 | Woiki et al. | | |
| 12,315,892 B2 * | 5/2025 | Reismann | ......... | H01M 10/0525 |
| 2007/0157704 A1 * | 7/2007 | Jenneus | ................ | G01M 3/226 |
| | | | | 73/40.7 |
| 2012/0292501 A1 | 11/2012 | Sugiyama et al. | | |

FOREIGN PATENT DOCUMENTS

| | | | |
|---|---|---|---|
| CN | 103163209 A | 6/2013 |
| CN | 103681203 A | 3/2014 |
| CN | 203519572 U | 4/2014 |
| CN | 110121613 A | 8/2019 |
| CN | 110411519 A | 11/2019 |
| CN | 110608860 A | 12/2019 |
| EP | 0 566 500 A2 | 10/1993 |
| EP | 2 592 408 A1 | 5/2013 |
| JP | 2000-149961 A | 5/2000 |
| JP | 2008-209352 A | 9/2008 |
| JP | 2015-161555 A | 9/2015 |
| JP | 2020-71903 A | 5/2020 |
| KR | 10-2012-0111080 A | 10/2012 |
| KR | 10-2020-0022042 A | 3/2020 |
| WO | 2011/089912 A1 | 7/2011 |
| WO | 2012/005199 A1 | 1/2012 |
| WO | WO 2019/215339 A1 | 11/2019 |

* cited by examiner $T_1$                    $T_2$ $T_1$                    $T_2$

SYSTEM AND METHOD FOR LEAK TESTING A BATTERY CELL

TECHNICAL FIELD

The invention relates to a method and a system for leak testing one or more finished battery cells. This method enables to check the leak tightness of the entire cell, or even only a portion thereof, when parts (such as anode, cathode and separator) and chemical substances (such as electrolytes) necessary to its operation have already been inserted in the cell and the cell has been sealed.

The leak testing is generally important for all the different types of batteries in order to guarantee the absence of leakages of electrolytes contained in the battery that may be corrosive and whose leakage may in any case affect overtime the correct functionalities of the battery.

This type of testing is even more fundamental to batteries, such as lithium-ion batteries, for which it is absolutely necessary to ensure that the environmental humidity or other chemical compounds coming from the outside cannot enter the battery, more particularly one or more cells forming the battery. This is to prevent the chemical substances, which are inside the battery or may form during its use, from coming into contact with water or other chemical compounds and reacting violently, or in any case affecting the functionalities of the battery.

BACKGROUND ART

Different types of techniques are currently used for leak testing batteries. Some of them require that each cell inside the battery has an inlet hole, that is an opening in the cell casing which makes the interior of the cell accessible and places it in communication with the external environment.

The leak test is thus carried out on an unfinished cells, i.e. a cell that has not been sealed yet.

Other techniques enable to carry out the leak test on one or more finished battery cells, i.e. cells in which the electrolytes have already been inserted and which have already been sealed.

Many of these techniques require that an additional gas, for example helium, is inserted in the cell together with the electrolytes for the sole purpose of leak testing. Such additional gas serves as tracer gas or indicator gas, that is it is the gas that will be detected by the mass spectrometer in the event of a leak.

After the cell has been placed inside the vacuum chamber, it is possible to detect by means of a mass spectrometer the tracer gas that possibly leaks from the cell into the vacuum chamber due to a leak in the cell and thus detect the presence of leaks in the cell.

Some examples of prior art are described hereinafter.
a. Testing the Battery Cell Using Air It is possible to test only the casing of the cell by supplying compressed air inside the cell, sealing the cell inlet hole and measuring the pressure drop or the flow rate possibly caused by a leak in the casing.
b. Testing of the Battery Cell Before the Electrolyte is Inserted into the Cell by Using Helium as Tracer Gas It is possible to test the empty cell casing or the casing that already contains anodes, cathodes and separators at a stage in which the electrolyte has not yet been inserted and the inlet hole through which the electrolyte is inserted in the cell is thus still open.

The cell is inserted in a vacuum chamber or in a storage chamber (depending on the leakage level that must be detected). Helium under pressure is then inserted inside the cell and the quantity of helium flowing from the inside of the cell to the chamber through the possible leak is measured by means of a mass spectrometer.

The main drawback of the two above-mentioned techniques is that the leak test is carried out on an unfinished cell, that is a cell which has not yet been sealed. It is therefore not possible to make a test on a cell in which the electrolyte has already been inserted and whose inlet hole has been sealed permanently.
c. Testing the Finished Cell, after the Electrolyte has been Inserted and the Cell has been Sealed, by Inserting Helium as Tracer Gas in the Cell During the Step of the Electrolyte Insertion As helium is an inert gas, it is theoretically possible—for the purposes of the leak test that will be carried out subsequently—adding a certain quantity of helium inside the cell while the electrolyte is inserted and before the inlet hole of the cell is sealed. After the cell has been positioned inside a vacuum chamber, it is possible to detect by means of a mass spectrometer the helium that possibly flows from the cell to the vacuum chamber through a possible leak.

The main drawback of this technique is that it is necessary to insert—for the sole purpose of leak testing—a further gas, that is the tracer gas, into the cell during a different stage of the battery production that occurs before the leak test stage and is typically performed by a third party. Moreover, the described technique might be applied to certain types of batteries having a rigid casing with an inner free space which can contain the tracer gas, but it might not be applied to pouch cells.
d. Testing the Finished Cell after the Electrolyte has been Inserted and the Inlet Hole of the Cell has been Sealed by Using a Technique Called "Bombing"

When it is not possible to add helium or another tracer gas inside the cell during the electrolyte insertion step, it is possible to use the technique called "bombing" to carry out the leak test employing helium as tracer gas.

The battery cell is first inserted into a bombing chamber in which helium under pressure is injected. If a leak is present in the cell, a part of the helium flows from the chamber inside the cell. The quantity of helium entering the cell depends not only from the free space inside the cell but also by the pressure level inside the chamber and the time of bombing.

After the bombing step, the battery cell is inserted into a vacuum chamber where the leakage level is measured by tracing by means of a mass spectrometer the quantity of helium flowing from the inside of the cell to the vacuum chamber through the leak present in the cell.

The main drawbacks of this technique are the overall cycle time, which could be very long and not compatible with industrial processes, and the acceptable overpressure level in the bombing chamber which must not exceed levels which could permanently deforming the casing of the cell.

Other techniques enable to identify possible leaks in one or more cells by detecting substances that are already present inside the cell, without the need to insert additional gas in the cell for the sole purpose of leak testing.

Such techniques share the need to prevent residues of gases and/vapors from forming or remaining inside the leak testing system. Such residues could affect the leak detection performed by the detecting and measuring instrument and pollute the detecting and measuring instrument and even the entire leak testing system over time.

Furthermore, such techniques share the need to ensure a reliable and repeatable measurement of the leak rate of a cell in the shortest time possible even in the case of very small leak.

DISCLOSURE OF THE INVENTION

Object of the present invention is to provide a method and a system for leak testing at least one battery cell which overcome the drawbacks of the known techniques.

More specifically, the present invention enable to measure the leak rate of a finished and completely sealed cell by detecting, according to suitable techniques, the substances (gases and/or vapors) that are already contained in or are generated inside the cell, without the need of inserting into the cell further chemical compounds, such as tracer or test gases, for testing purposes. In other words, the method according to the invention allows to detect one or more specific substances that are inside the cell, that is to say carry out a measurement of the quantity of said substance(s) that is/are present in a certain volume over a given period of time, and determine by comparison if the detected leak rate value is acceptable with respect to a known leak rate value or preset threshold values and if the cell has to be discarded or not.

The leak test according to the invention is carried out on the finished cell, that is a cell in which the electrolyte has been inserted into the casing of the cell and the inlet hole in the casing has been sealed. The test can be carried out at any time, regardless of whether the cell has been subjected to an activation process (a step called "formation"), by detecting the leak of aeriform elements, such as gases and/or vapors, of various nature from the inside of the cell.

The present invention also allows to have a substantially memory-free leak testing system wherein one or more of its components are heated to prevent residues of gases and/or vapors leaking from the cell from being deposited on the internal walls of said components, residues that could affect the current leak test and the subsequent ones.

The present invention also allows to improve the detection of a possible leak by increasing the pressure inside the leak testing system during a specific phase of the leak test cycle and making sure that the gases and/or vapors leaking from the cell reach the detecting and measuring instrument faster and in larger quantities.

BRIEF DESCRIPTION OF THE DRAWINGS

The invention is now described in detail with reference to embodiments illustrated in the annexed drawings, to be understood as exemplary and non-limiting, wherein.

BEST MODE FOR CARRYING OUT THE INVENTION

Figure 1:
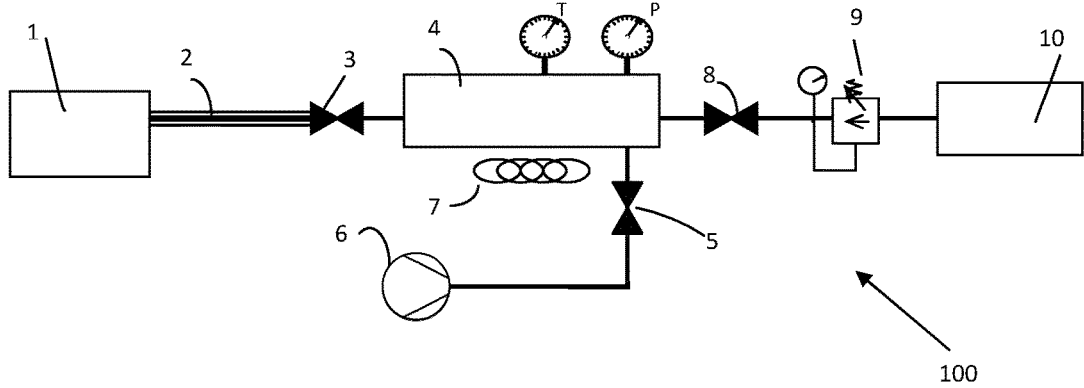
FIG. 1 schematically shows a first embodiment of a leak testing system according to the present invention.

A system for leak testing a battery cell (not visible in the figures) is shown in simplified way in FIG. 1 and is indicated as a whole with reference number 100.

The cell to be tested typically comprises a casing closed by a cover and provided, at the cover, with an inlet hole through which parts and chemical substances which are necessary to the operation of the battery can be inserted into the casing. Chemical substances, for example electrolytes, even in the liquid state, can be inserted in the casing of the cell.

In all the currently designed batteries, more specifically inside the casing of the single cell, an electrolyte composed of particular salts dissolved in one or more solvents, typically of organic nature, is inserted.

In lithium-ion batteries, for example, mixtures of two or more electrolytes such as Ethylene carbonate, Propylene carbonate, Vinylene carbonate, Dimethyl carbonate, Ethyl Methyl Carbonate, Diethyl Carbonate, are typically used.

After the electrolyte has been inserted into the cell, the inlet hole in the cover is sealed with a sealing closure element which prevents substances present in the cell to come into contact with the environment outside the cell.

Hereinafter "finished cell" means a cell that has already been subjected to the electrolyte insertion step and the sealing step. The leak test according to the present invention is applied to such finished cell and is carried out by detecting aeriform elements such as gases and/or vapors which flow out of the cell in cases of leak, for example through defects, such as openings or unwanted spaces, in the closure element sealing the inlet hole, in the casing or in cover. The detected gases and/or vapors may have different origin as explained in more detail hereinafter.

The leak testing system 100 comprises a plurality of components, including a vacuum chamber, schematically shown with a dashed box and indicated in FIG. 1 with reference number 4. The cell to be tested is placed in whole or at least in part (depending on the area to be tested) in the vacuum chamber 4 to create a pressure difference between the inside of the cell, which has a higher pressure, and the external environment, in this case consisting in the inside of the vacuum chamber 4.

This pressure difference causes one or more substances contained in the liquid electrolyte inside the cell to partially vaporize, and/or gases—deriving from induced or spontaneously generated processes—which are partially dissolved in the electrolyte inside the cell to revert to the gaseous state. In other words, for testing purposes the cell is located in an environment subjected to a vacuum level which allows to increase the possible leak and reduce the background noise, i.e. noise due to the air present in the environment outside the cell.

The pressure difference is created in a known way inside the vacuum chamber by means of a vacuum pump 6 connected thereto. A coupling valve 5 is placed between the vacuum pump 6 and the vacuum chamber 4 and enables or disables the connection between them. According to an alternative embodiment, the coupling valve 5 may be replaced with a known, different connection device.

The pressure difference between the inside of the cell and the external environment (i.e. the inside of the vacuum chamber 4) eases the flow of substances, in the gaseous or vapor state, from the inside of the cell to the vacuum chamber 4.

The pressure difference, more specifically the pressure difference between the inside of the vacuum chamber and the inside of the cell to be checked, varies as a function of the aeriform element that must be detected and may be determined either when the aeriform element to be detected is identified or when the system is designed, for example depending on the type of cell to be checked.

These gases and/or vapors leaking from the cell are then evacuated from the vacuum chamber 4 and conveyed to a detecting and measuring instrument 1, for example a quadrupole mass spectrometer, that has been suitably programmed to detect such gases and/or vapors.

Preferably, a connection valve 3 (shown very schematically) positioned between the vacuum chamber 4 and the mass spectrometer 1 enables or interrupts the connection between the vacuum chamber 4 and the mass spectrometer 1.

The connection valve 3 can be a heated valve with low residual volume.

A heated capillary element, or simply capillary, 2 that connects the mass spectrometer 1 to the vacuum chamber 4 is positioned between the mass spectrometer 1 and the connection valve 3.

It is known to use a heated capillary to prevent or reduce the formation of condensation, that is the deposit of water vapor, which typically forms on the walls of the conduits through which the gases and/or vapors pass.

It has been found empirically that the use of a heated inlet capillary of the mass spectrometer, in addition to performing the function of preventing/reducing condensation, allows to avoid that the aeriform elements passing through the capillary element settle leaving residues on the walls of the capillary element itself. Over time, these residues can pollute the mass spectrometer, adversely affecting the reliability of the instrument and of the performed test. For example, pollution of the mass spectrometer may cause an increase in the background noise and a reduction in the available measuring range.

Heating one or more components of the leak testing system 100, for example the capillary element 2, makes the leak testing system 100 substantially memory-free. In other words, the leak testing system 100 does not retain residues following the passage of the gases and/or vapors detected during the test: a deposit of these gases and/or vapors would pollute the mass spectrometer, preventing the subsequent test from being carried out or making it unreliable in any case. Indeed, in the subsequent test there would be gases and/or vapors from the previous test cycle which not only would alter the detected values but which would saturate the mass spectrometer over time. When this occurs, it is necessary to interrupt the test and subject the system to a cleaning cycle that usually takes time and is incompatible with the battery production processes time.

If a large leak is detected inside the vacuum chamber 4, the presence of the connection valve 3 allows to interrupt the connection between the vacuum chamber 4 and the heated capillary 2 and to avoid contamination of the final part of the measuring circuit, i.e. the one comprising the capillary 2 and the mass spectrometer 1. Measuring circuit means the set of components and the relative connection conduits through which the gases flow and that form the leak testing system 100.

The leak testing system 100 further comprises heating devices which supply heat to the heated capillary 2 and possibly to other components of the leak testing system 1 which may need to be heated during the testing cycle, such as the vacuum chamber 4 and the connection valve 3. The use of heating devices serves to avoid the condensation of the gases and/or vapors leaking from the cell due to a leak.

The heating devices can comprise the mass spectrometer 1 and/or a heat generator, schematically represented by a series of circles and indicated with the reference number 7.

According to a preferred embodiment, the heated capillary 2 is heated by the mass spectrometer 1 directly.

Heating other system components in addition to the heated capillary 2, such as the vacuum chamber 4 and the connection valve 3, may help to make the leak testing system 100 substantially memory-free and to prevent the contamination of the leak testing system 100 even more effectively.

If the heat generator 7 is used, the vacuum chamber 4 should be equipped with a pressure sensor and a temperature sensor, indicated in the figure respectively with the reference P and T, which allow to keep under control the conditions inside the vacuum chamber 4.

The pressure sensor P may be provided independently of the presence of the heating generator 7, because in general it can be used to detect anomalies which can occur during the test cycle.

According to a preferred embodiment, the leak testing system 100 further comprises an auxiliary gas container or tank 10, such as compressed air, argon, nitrogen or helium, whose function is to ease the flow of the aeriform elements which may have leaked from the cell towards the capillary 2 and then towards the mass spectrometer 1. In other words, using the auxiliary gas it is possible to push the molecules of the aeriform elements escaping from the cell towards the mass spectrometer 1. The auxiliary gas container 10 is connected to the chamber vacuum 4 by means of a further valve 8 through which the auxiliary gas enters the vacuum chamber 4, hereinafter also called inlet valve. The inlet valve may be replaced with a different, known connection device, preferably automatically controlled.

In a preferred embodiment, between the auxiliary gas container 10 and the inlet valve 8 there is a pressure regulator 9 which has the function of keeping under control the pushing pressure of the auxiliary gas ensuring that the test always takes place in the same conditions and thus improving its repeatability.

The leak testing system 100 can comprise a processing unit, not shown, which receives and processes output data from the mass spectrometer 1. To improve the detection of leaks in the cell, the vacuum chamber 4 can have an elongated shape which ease the channeling of the aeriform elements to be detected towards the capillary 2 and thus the mass spectrometer 1. Furthermore, the inlet valve 8 can be positioned at the opposite end of the leak testing system with respect to the position of the capillary 2.

According to a preferred embodiment, the leak testing system 100 can be equipped with mechanical means which reduce the volume inside the components of the leak testing system, i.e. inside the vacuum chamber 4 or inside the measuring circuit, for example along the passage from the vacuum chamber 4 to the mass spectrometer 1, thereby causing a compression of the aeriform elements escaping from the cell during the test. Such mechanical means, shown in FIGS. 2 and 3, will be illustrated hereafter in more detail.

The present invention further provides a method for leak testing a battery cell. The method is described by making reference to the leak testing system 100 described above but it can be implemented by using other leak testing systems.

The leak testing according to the present invention comprises the following steps.

At the beginning of the test cycle, the mass spectrometer 1 is in a stand-by condition and the heated capillary 2 communicates with the vacuum chamber 4 which at this stage is open (at the atmospheric pressure) and empty (without any battery cell).

If provided, the connection valve 3 is normally open (it is closed only if a gross leak is detected in the initial phase or in other phases of the test cycle so as to prevent or minimize in any case the contamination of the capillary 2 and the mass spectrometer 1).

If the heat generator 7 is provided and if the test cycle requires it, the vacuum chamber 4 is heated until it reaches the desired temperature.

After the cell to be tested is placed inside the vacuum chamber 4 the vacuum chamber is sealed and the coupling valve 5 connecting the vacuum pump 6 and the vacuum chamber 4 is opened starting a vacuum creation phase.

After a desired vacuum level (i.e. a desired pressure difference between the inside of the cell and the external environment) has been reached, the coupling valve 5 between the vacuum pump 6 and the vacuum chamber 4 is closed. The desired vacuum level can be obtained by allowing a preset time to elapse or by monitoring the pressure level by means of the pressure sensor P if provided.

A stabilization or accumulation phase then begins in which the substances present inside the cell, for example dimethyl carbonate, vaporize and in the event of defects, i.e. unwanted spaces or openings in the cell causing leaks, escape from the cell in the form of gas and/or vapor.

According to a preferred embodiment, to prevent contamination of the heated capillary 2 and the mass spectrometer 1, an intermediate checking phase is provided at the end of the stabilization phase. After a predetermined time for the stabilization phase has elapsed, the gases and/or vapors leaking from the cell are detected by the mass spectrometer 1 in a known way. More specifically, the gases and/or vapors escaping from the cell are detected by the mass spectrometer 1 and, once values corresponding to the quantity of the detected gases and/or vapors have been processed, these values are compared with predetermined threshold values.

If the leak rate is greater than the predetermined threshold values, the connection valve 3 (if provided) is immediately closed to avoid contamination of the heated capillary 2 and the mass spectrometer 1. In any case, the test cycle is interrupted and the cell discarded.

If the leak rate is smaller than the predetermined threshold values, the test cycle continues and a pushing or acceleration phase begins.

As an alternative, if the leak testing system 100 comprises the pressure sensor P, the intermediate checking phase can be carried out by checking that the pressure difference between the beginning and the end of the stabilization phase is lower than a preset threshold value.

However, it is possible to omit this intermediate checking phase and after the predetermined time for the stabilization phase has elapsed go directly to the pushing or acceleration phase.

In this phase, the inlet valve 8 is opened so as to allow the feeding of auxiliary gas into the vacuum chamber for a predetermined time. The fed auxiliary gas pushes the gases and/or vapors escaping from the cell towards the heated capillary 2, easing its flow towards the mass spectrometer 1.

Generally a gas with very different characteristics from those of the aeriform elements leaking from the cell is used as auxiliary gas. In other words, the auxiliary gas has a chemical composition which is different from that of the aeriform elements to be detected and doesn't alter the spectrometer reading in any manner.

If, for example, the aeriform elements to be detected consist of dimethyl carbonate (DMC), the auxiliary gas that represents the best compromise between performance and costs is argon. However, it is possible to use other gases such as nitrogen, helium, compressed air or ambient air.

According to a preferred embodiment, the auxiliary gas is fed into the vacuum chamber not with a constant flow but in an pulsed way (i.e. impulsively), in the form of a puff. This puff has a high concentration of auxiliary gas.

According to a preferred embodiment, the pressure regulator allows to keep under control the pushing pressure with which the puff of auxiliary gas is fed into the vacuum chamber 4.

The use of a puff of auxiliary gas with a high concentration causes the pressure inside the vacuum chamber 4 to increase very quickly and the aeriform elements escaping from the cell to be transported not only more quickly to the capillary 2 and the mass spectrometer 1 but even in larger quantities in a limited time. This allows to optimize the detection and cycle time by reducing its duration and to obtain better performances since the quantity of aeriform elements that reaches the mass spectrometer is greater than that one that would reach the mass spectrometer using a continuous flow of auxiliary gas.

Figure 4:
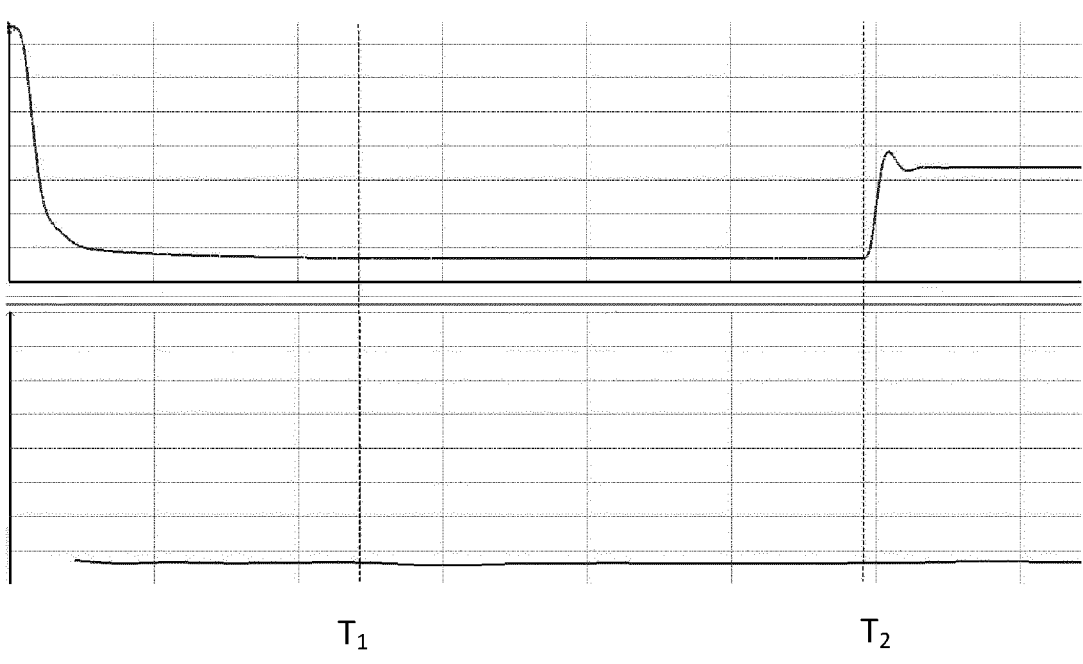
FIG. 4 shows a first diagram relating to a cell without leaks.
Figure 5:
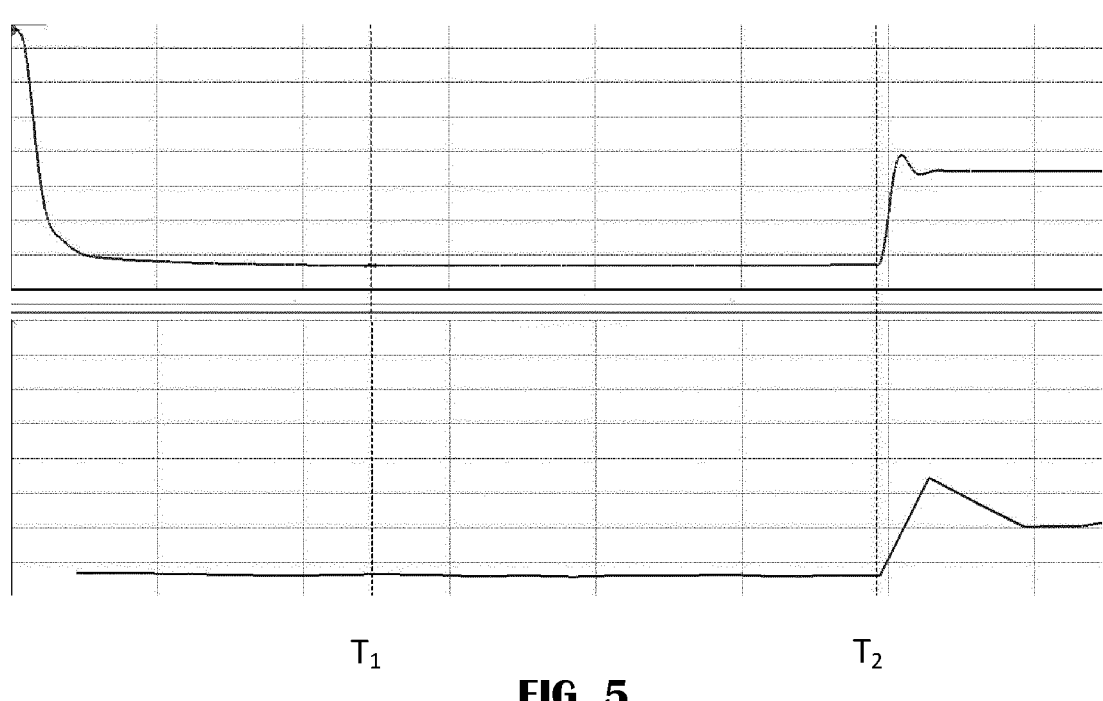
FIG. 5 shows a second diagram relating to a cell with a leak.

FIGS. 4 and 5 show diagrams of a leak testing cycle relating to a cell without leak and to a cell with leak, respectively, They both show the three phases mentioned above. T1 and T2 mark the transition from the vacuum creation phase to the stabilization phase and from the stabilization phase to the acceleration phase, respectively. As visible in the figures, the signal detected in case of leak has a peak in the acceleration phase when the puff of auxiliary gas occurs. The extent of the peak is proportional to the detected leak rate.

The amount of auxiliary gas impulsively injected inside the vacuum chamber 4 is defined a priori based on the type of leaking test to be performed. This quantity must indeed be proportional to the volume of the vacuum chamber so that the aeriform elements escaping from the cell are not too diluted.

The use of an auxiliary gas puff in the acceleration phase has the function of raising the pressure, within a defined and limited time, inside the leak testing system, more particularly inside the vacuum chamber, increasing, in a defined and limited time, the flow of the aeriform elements escaping from the cell inside the vacuum chamber towards the mass spectrometer and improving the detection of such aeriform elements by the latter.

Such an increase in pressure can also be obtained by equipping the leak testing system 100 with the mechanical means mentioned above and better described below.

Auxiliary gas in the form of a highly concentrated puff and mechanical means to reduce the volume inside the measuring circuit can be used in combination or alternatively one with respect to the others.

After the gases and/or vapors escaping from the cell have reached the spectrometer, leak detection is performed in a known way by the latter, comparing the detected values with appropriate thresholds.

The leak rate of the cell is determined by processing signals appropriately. According to a preferred embodiment, the leak rate is determined by considering the maximum leak peak detected during the pushing phase. However, it is possible to process signals in a different way, by taking into account for example the average of the readings made by the mass spectrometer.

As previously stated, the aeriform elements leaking from the cell consist of gases and/or vapors.

It is possible to program the spectrometer in such a way that during the leak test both gases and vapors are detected simultaneously.

According to one of the embodiments, the spectrometer can be programmed in such a way that the system detects first the gases, so as to identify even very small leaks, and second the vapors so as to identify possible larger leaks. Indeed, in the event of gross leaks possible gases inside the cell escape more rapidly from the latter and the probability to detect, during the leak test, quantities of gases sufficient to indicate a leak is lower. It is also possible, according to a different embodiment, detecting first the vapors and second the gases.

As mentioned briefly above, the aeriform elements—gases and vapors—detected during the leak test derive from substances and/or parts which are already present in the cell and are necessary to its operation. These elements can have different origin.

The detected vapors may originate, for example, from substances, such as solvents, contained in the electrolyte inserted into the cell during the normal production process. Since such substances are usually rather volatile, the leak test can be carried out by exploiting their vaporization.

The at least partial vaporization of such substances is due to the pressure variation induced inside the vacuum chamber.

In cases of leak due to defects in the portion of the cell casing containing the electrolyte, the electrolyte can escape from the cell not in the form of vapor but in the form of liquid. In this case the depression induced in the vacuum chamber causes the vaporization of the electrolyte inside the vacuum chamber.

In cases of leak due to defects in the portion of the casing that doesn't contain the electrolyte, for example in the inlet hole of the cover or in the cover itself, the vaporization of the substances contained in the electrolyte, caused by the depression induced in the vacuum chamber, takes place inside the cell and the substances that escape from the cell are already in the form of vapors. It is thus possible to identify a leak in the cell by detecting the substances contained in the electrolyte in the form of vapor.

The gases detected during the leak test according to the invention may be gases that are already present as such in the cell and are derived from chemical reactions that are generated spontaneously inside the cell. Or they may be gases that are generated during an activation process of the battery—called "formation process"-consisting in subsequent charge/discharge cycles to which sealed cells are generally put through.

Normally, during the formation process gases form, whose actual composition and quantity depend on the type of electro-chemical reaction occurring inside the cell, but which generally include substances such as $CH_4$, $C_2H_6$, $C_3H_8$, $C_4H_{10}$, $CO_2$, $CO$, $H_2$. In pouch cells the excess quantity of these gases are normally eliminated, but a part remains in any case dissolved inside the electrolyte.

Similarly to what happens when vapors are detected, the depression induced in the vacuum chamber causes the gases to revert to the gaseous state, if in the time interval between the formation process and the leak test these gases have reverted to the liquid state and are dissolved in the electrolyte, and to escape from the cell if there are leaks.

As mentioned briefly previously, it is possible to equip the leak testing system with mechanical means which are actuated during the acceleration phase and cause a progressive reduction in the volume inside the measuring circuit with a consequent compression of the aeriform elements and of the auxiliary gas, i.e. an increase in pressure within the measurement circuit. This entails an increase in the flow of the aeriform elements towards the mass spectrometer; a smaller quantity of auxiliary gas is consequently required and the control cycle is speeded up.

In other words, the actuation of the mechanical means during the acceleration phase causes an increase in the pressure in the vacuum chamber, or in another part of the measurement circuit, thereby easing and accelerating the flow of auxiliary gas and aeriform elements escaping from the cell towards the mass spectrometer 1.

The use of these mechanical means has the further advantage of speeding up the leak testing cycle without diluting the concentration of the gases and/or vapors to be detected, since the increase in pressure is obtained by compressing the gases and/or vapors without the need to inject high quantities of auxiliary gas which contribute to dilute the concentration of gases and/or vapors to be detected.

Figure 2:
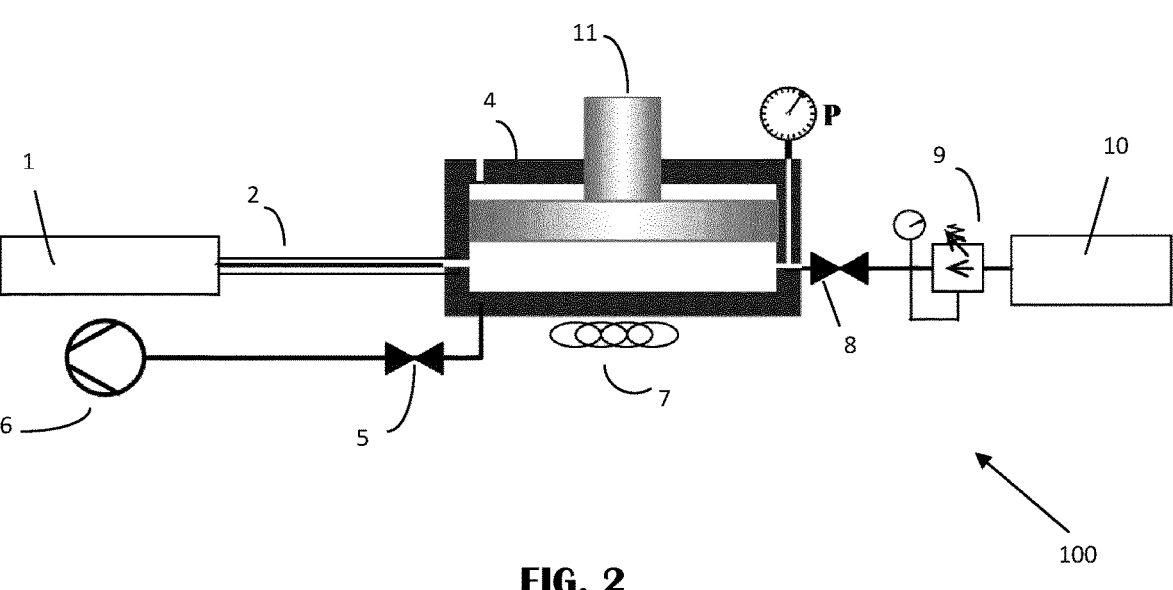
FIG. 2 schematically shows a second embodiment of a leak testing system according to the present invention.

FIG. 2 shows a first embodiment of these mechanical means which allows to obtain a variable volume vacuum chamber. The vacuum chamber 4 is in this case provided with a piston 11 whose actuation during the pushing phase allows to reduce the internal volume of the vacuum chamber itself. The leak testing system shown in FIG. 2 can also comprise the connection valve 3 (not visible in the figure).

Alternatively, it is possible to make the mechanical means in a different way by modifying the structure of the system so that a piston 12, provided with its casing, is connected to the mass spectrometer 1 and positioned more particularly between the vacuum chamber 4 and the heated capillary 2.

Figure 3:
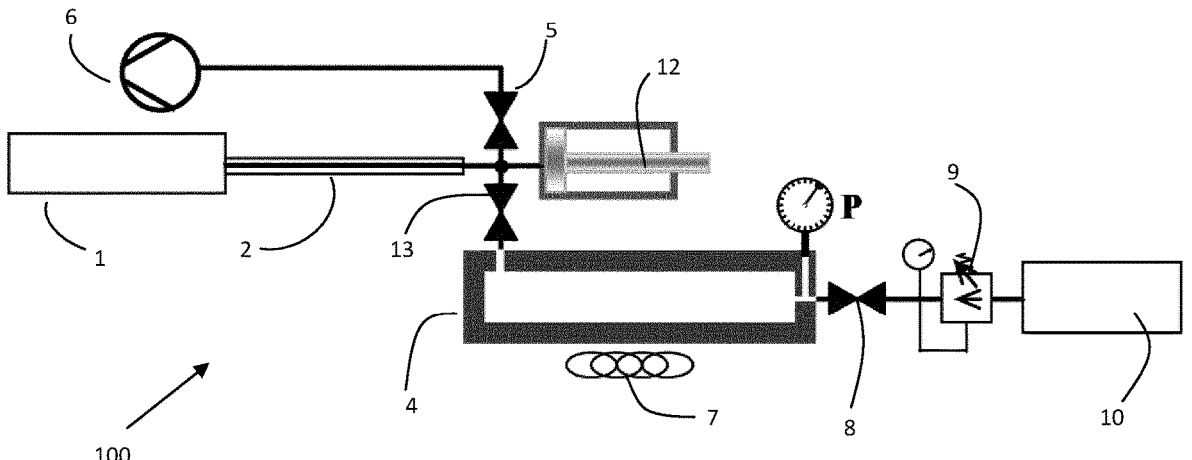
FIG. 3 schematically shows a third embodiment of a leak testing system according to the present invention.

In the embodiment shown in FIG. 3, the vacuum pump 6 is connected to the measuring circuit between the heated capillary 2 and the piston 12 through the coupling valve 5. An additional valve 13 is positioned between the vacuum chamber 4 and the piston 12.

The operation of the piston 12 during the acceleration phase is as follows. Through the vacuum pump 6, the desired vacuum level is created inside the vacuum chamber 4; the coupling valve 5 and the additional valve 13 are open and the piston 12 is in the rear position, i.e. it does not apply any action to the measuring circuit.

The valves 5 and 13 are closed and the gases and/or vapors that may escape from the cell accumulate inside the vacuum chamber 4. The inlet valve 8 is opened to allow the injection of auxiliary gas into the chamber to be vacuum 4 and also the valve 13 is opened to bring the vacuum chamber 4 in communication with the mass spectrometer 1. The piston 12 passes from the rear position to an advanced position applying a further thrust to the gases and/or vapors and improving their flow towards the mass spectrometer 1.

As previously stated, the mass spectrometer must be programmed so as to detect specific gases and/or vapors during the leak test.

If the substances contained in the cell and thus the gases and/or vapors to be detected are not known a priori, at first a test may be carried out on a cell with a leak in order to identify the gases and/or vapors that have to be detected.

After the substances that must be detected to measure the leak rate have been identified, the spectrometer is suitably programmed to detect these substances only.

As explained above, the leak testing method according to the present invention comprises three phases: vacuum creation phase, stabilization or accumulation phase and pushing or acceleration phase. According to a preferred embodiment, the duration of each phase is predetermined. In the event that the aeriform elements escaping from the cell consists of DMC, each phase may have, for example, a duration of about two seconds.

In the embodiments described above, the detection of gases and/or vapors is carried out by means of a quadrupole mass spectrometer, but different techniques and instruments can be used, for example a gas chromatograph.

According to an alternative embodiment, a purge or cleaning cycle can be carried out between a leak test cycle and the next. The purge cycle has the purpose of removing from the system components, for example from the vacuum chamber, the spectrometer and the pumping systems, possible aeriform elements escaped during previous leak test cycles. Such elements could contaminate the system and affect the subsequent test cycles.

If during a previous leak test carried out on a cell with a leak a considerable quantity of gases and/or vapors was released inside the system, these gases and/or vapors could remain inside the components of the system even after the test cycle is finished and their presence could be detected also during subsequent tests, thus compromising the reliability of the test results.

The purge cycle is used to remove any contamination of the system before carrying out a new test.

The purge cycle can be carried out before the cell to be tested is positioned in the vacuum chamber, or after it has already been positioned and before the leak test starts.

If the cell to be tested has already been positioned in the vacuum chamber, during the purge cycle the gases/vapors present in the vacuum chamber are evacuated by means of the vacuum pump, keeping closed the connection valve connected to the mass spectrometer.

After the pressure inside the vacuum chamber has been decreased to a suitable value, an inert gas, such as helium or argon, is injected into the vacuum chamber. The pressure inside the vacuum chamber then increases until a preset pressure level is reached.

The vacuum pump is then started again and the pressure inside the vacuum chamber is decreased until a predetermined vacuum level for carrying out the leak test is reached. During this operation all the contaminants present in vacuum chamber, that is the gases/vapors possibly escaped from the tested cell during the previous test cycle, are diluted by the inert gas. The percentage of residual contaminants after the predetermined vacuum level has been reached is consequently reduced to an acceptable level. At this stage the connection valve connecting the vacuum chamber to the spectrometer can be opened and the leak test is carried out.

The same operation can be carried out when the vacuum chamber is empty, that is before the cell to be checked is positioned in the vacuum chamber in order to purge the vacuum chamber and acquire the background level of the vacuum chamber in relation to the presence of the specific aeriform elements (gases and vapors) which are detected during the leak test. "Acquire the background level" means to detect, after an appropriate level of pressure has been induced inside the vacuum chamber, the chemical elements that are structurally present in such vacuum chamber as they depend on physical and structural characteristics of the internal environment of the chamber and that could affect the reading of the instrument. The leak rate that must be associated with the cell to be checked indeed corresponds to the leak rate detected by the spectrometer from which the value associated with the background level of the vacuum chamber has been subtracted.

The step of acquiring the background level of the vacuum chamber, which must be performed when the cell to be checked has not yet been inserted into the vacuum chamber, has been described with reference to the performance of the purge cycle of the entire test system, but it can also be performed before carrying out every leak test.

The leak testing system and method described herein refer to the test of a single battery cell. However, it is possible to position inside the vacuum chamber and test several cells simultaneously. In this case the system gives a general indication of the leak rate without indicating which cell has actually a leak. To have information on the leak rate of the single cell it is necessary to subject the latter to a subsequent, dedicated leak test, similar to the previous one.

The embodiments of the present invention described up to now refer to the leak test of a cell contained for example in a lithium-ion battery. The leak testing system and method according to the invention can also be applied to different types of batteries, such as solid-state batteries.

The invention claimed is:

1. A leak test system for leak testing at least one battery cell, the battery cell being sealed and comprising parts and/or substances used for operation of the battery cell, the system comprising:
    a vacuum chamber;
    a vacuum pump connected to the vacuum chamber;
    a detecting and measuring instrument connected to the vacuum chamber to detect gases and/or vapors derived from the parts and/or the substances inside the battery cell;
    a capillary element connecting the detecting and measuring instrument to the vacuum chamber and through which the gases and/or vapors flow; and
    one or more heating devices configured to heat at least one of the components of the leak test system to prevent residues of the gases and/or vapors from being deposited on the internal walls of the components.

2. The leak test system of claim 1, wherein the capillary element is heated by the one or more heating devices.

3. The leak test system of claim 2, wherein the one or more heating devices are part of the detecting and measuring instrument, and the capillary element is heated by the detecting and measuring instrument.

4. The leak test system of claim 2, further comprising a connection valve at the entrance of the capillary element, the connection valve being configured to enable or interrupt the connection between the capillary element and the vacuum chamber to prevent the capillary element and the detecting and measuring instrument from being contaminated.

5. The leak test system of claim 4, wherein the one or more heating devices are configured to heat the connection valve and/or the vacuum chamber.

6. The leak test system of claim 4, wherein the connection valve is configured to interrupt the connection between the capillary element and the vacuum chamber when the amount of the gases and/or vapors is greater than a threshold amount.

7. The leak test system of claim 1, further comprising a piston that, when actuated, reduces the internal volume of at least one of the components of the leak test system and causes the compression of the gases and/or vapors so as to push the gases and/or vapors towards the detecting and measuring instrument.

8. The leak test system of claim 7, wherein the piston is positioned inside the vacuum chamber or between the vacuum chamber and the detecting and measuring instrument.

9. The leak test system of claim 1, wherein the gases and/or vapors detected by the detecting and measuring instrument comprise dimethyl carbonate.

10. The leak test system of claim 1, further comprising a container of auxiliary gas configured to release a gas to push the gases and/or vapors towards the detecting and measuring instrument.

11. The leak test system of claim 10, wherein:

the detecting and measuring instrument is configured to determine a leak rate as the volume of the gases and/or vapors over a time period, and container of auxiliary gas is configured to release the gas when the leak rate is less than a threshold value.

12. The leak test system of claim 1, wherein the detecting and measuring instrument is configured to determine a leak rate as the volume of the gases and/or vapors over a time period.

13. The leak test system of claim 1, wherein the detecting and measuring instrument is a mass spectrometer.

14. The leak test system of claim 1, further comprising a coupling valve between the vacuum pump and the vacuum chamber and a pressure sensor in the vacuum chamber, wherein the coupling valve is configured to be closed when the pressure difference between the inside of the battery cell and the inside of the vacuum chamber has reached a pre-determined difference.

15. The leak test system of claim 1, further comprising a temperature sensor in the vacuum chamber.

16. A method for leak testing a battery cell, the battery cell being sealed and comprising parts and/or substances used for operation of the battery cell, using a leak test system comprising a vacuum chamber and a detecting and measuring instrument, the method comprising;

positioning the battery cell in the vacuum chamber;

sealing the vacuum chamber;

decreasing the pressure inside the vacuum chamber to a lower level than the level of pressure inside the battery cell;

detecting the gases and/or vapors using the detecting and measuring instrument;

identifying the presence of leaks in the battery cell by comparing an amount of the detected gases and/or vapors to a threshold; and heating at least one of the components of the leak test system using one or more heating devices to prevent residues of the gases and/or vapors from depositing being on the internal walls of the components.

17. The method of claim 16, wherein the leak test system further comprises a capillary element, and heating the at least one of the components comprises heating the capillary element.

18. The method of claim 17, wherein the one or more heating devices are part of the detecting and measuring instrument, and heating the capillary element is using the detecting and measuring instrument.

19. The method of claim 17, wherein the leak test system further comprises a connection valve between the vacuum chamber and the capillary element, and heating the at least one of the components comprises heating the connection valve and/or the vacuum chamber.

20. The method of claim 16, further comprising programming the detecting and measuring instrument to detect the gases and/or vapors that leak from the battery cell.

* * * * *